(12) United States Patent
Wang et al.

(10) Patent No.: US 12,466,587 B2
(45) Date of Patent: Nov. 11, 2025

(54) SYSTEM AND METHOD FOR MOBILE LANDING OF UNMANNED VEHICLE

(71) Applicant: aiseed Inc., Taipei (TW)

(72) Inventors: Tsung-Yuan Wang, Taipei (TW); Chih-Ting Li, Taipei (TW); Shou-Hsien Wang, Taipei (TW)

(73) Assignee: aiseed Inc., Taipei (TW)

( * ) Notice: Subject to any disclaimer, the term of this patent is extended or adjusted under 35 U.S.C. 154(b) by 131 days.

(21) Appl. No.: 18/376,859

(22) Filed: Oct. 5, 2023

(65) Prior Publication Data
US 2024/0343427 A1 Oct. 17, 2024

(30) Foreign Application Priority Data
Apr. 13, 2023 (TW) .................. 112113841

(51) Int. Cl.
*B64U 70/95* (2023.01)
*G05D 1/244* (2024.01)
*G05D 1/654* (2024.01)
*G08G 5/54* (2025.01)
*G08G 5/55* (2025.01)
*G08G 5/57* (2025.01)

(52) U.S. Cl.
CPC .............. *B64U 70/95* (2023.01); *G05D 1/244* (2024.01); *G05D 1/6542* (2024.01); *G08G 5/54* (2025.01); *G08G 5/55* (2025.01); *G08G 5/57* (2025.01); *B64U 2201/10* (2023.01)

(58) Field of Classification Search
CPC .. B64U 70/95; B64U 2201/10; G05D 1/6542; G05D 1/244; G08G 5/54; G08G 5/57; G08G 5/55
See application file for complete search history.

(56) References Cited

FOREIGN PATENT DOCUMENTS

WO WO-2018035835 A1 * 3/2018 ........... B64C 39/024

* cited by examiner

*Primary Examiner* — Michael D Lang
(74) *Attorney, Agent, or Firm* — HDLS IPR SERVICES; Chun-Ming Shih

(57) ABSTRACT

The present invention relates to a system and a method for mobile landing of an unmanned vehicle. The method includes: detecting a landing target pattern by a three-dimensional sensing module and transmitting the landing target pattern to a calculation module, the landing target being a moving object; calculating, by the calculation module, a relative correction parameter of a guiding coordinate position of a return side relative to a coordinate position of the unmanned vehicle according to the landing target pattern and the guiding coordinate position of the return side; correcting, by the calculation module, the guiding coordinate position of the return side according to the relative correction parameter to obtain a corrected guiding coordinate position; then calculating, by the calculation module, a deviation value between the corrected guiding coordinate position and the coordinate position of the unmanned vehicle, and transmitting the deviation value to the vehicle side control module, and controlling, by the vehicle side control module, the unmanned vehicle to arrive at the return side according to the deviation value. The present invention thereby achieves a precise dynamic target landing.

8 Claims, 2 Drawing Sheets

SYSTEM AND METHOD FOR MOBILE LANDING OF UNMANNED VEHICLE

REFERENCE TO RELATED APPLICATIONS

The present application is based on, and claims priority from, Taiwan application number 112113841, filed 2023 Apr. 13, the disclosure of which is hereby incorporated by reference herein in its entirety.

BACKGROUND OF THE INVENTION

Field of the Invention

The present invention relates to a system and method for mobile landing of an unmanned vehicle, and in particular to a system and method for correcting a coordinate position of a return side of an unmanned vehicle by recognizing an image and generating a deviation value to enable a precise landing of the unmanned vehicle on a moving object.

Description of the Prior Art

A communication protocol for an unmanned aerial vehicle (UAV) is a communication protocol based on serial port communication, which is mainly applied to the communication of micro aerial vehicle (also known as the UAV).

In the existing communication protocol for an UAV, a RTL (Return To Launch) function can provide launch storage and guide the UAV to fly back to a launch site at the end of a mission. However, an address of the launch site has to be updated from time to time when a landing site is moving. When RTL is started, the address of the launch can only be updated to a current last updated position, so that it is impossible to know a movement distance of a moving target after starting.

If the UAV wants to land on the moving target, a GNSS (Global Navigation Satellite System) guidance system additionally installed on the moving target updates a latitude and a longitude and transmit them back to the UAV. However, there is an error between the GNSS navigation system of the UAV and the guidance system on the moving target. For example, if a coordinate position of a point A at a sky side is (1, 1), a labeled position at a ground side is (0, 0), and inputting the labeled position at the ground side to the sky side will cause an offset. Therefore, on the premise of only relying on the UAV and the GNSS on the moving target, a precise landing cannot be achieved due to too large error.

In general, for a precise landing, an image recognition system (IRS) is additionally installed on the UAV, a recognizable pattern is placed at a landing position, a relative position of a 2D (two-dimensional) pattern back to a 3D (three-dimensional) pattern is recognized by the projection of the IRS, and a position of a home site (the landing site or launch site) is found out through the conversion between a coordinate system of the IRS and a geodetic coordinate system. However, the attitude change of the UAV will also lead to changes in the position of the home site. For example, when an elevation angle of the UAV is 0 degree directly above the point A, coordinates of the image recognition system are displayed as (0, 0), but when the elevation angle of the UAV is 30 degrees, coordinates of the image recognition system are displayed as (0, −0.5). Therefore, the UAV practicing the precise landing in accordance with the image recognition system is like falling leaves drifting, which is slowly approaching, resulting a failure in tracking a moving landing site often due to the attitude change.

In summary, since the existing UAV is unable to accurately land on the moving target, it becomes an urgent project to be improved in the industry.

SUMMARY OF THE INVENTION

In view of various shortcomings of the above-mentioned prior art, after many years of research and experimentation, the present inventor finally succeeded in developing and completing a system and method for mobile landing of an unmanned vehicle according to the invention.

The present invention discloses a system for mobile landing of an unmanned vehicle comprising a vehicle body. The system for mobile landing of the unmanned vehicle comprises a three-dimensional sensing module, a calculation module, a vehicle side control module, and a vehicle side navigation sensing module. The three-dimensional sensing module, the calculation module, the vehicle side control module, and the vehicle side navigation sensing module are provided in the vehicle body. The three-dimensional sensing module is electrically connected to the calculation module. The calculation module is electrically connected to the vehicle side control module. The vehicle side control module is electrically connected to the vehicle side navigation sensing module.

Where, the three-dimensional sensing module detects a landing target pattern and transmits the landing target pattern to the calculation module, the landing target being a moving object: the calculation module calculates a relative correction parameter of a guiding coordinate position of a return side relative to a coordinate position of the unmanned vehicle according to the landing target pattern and the guiding coordinate position of the return side; the calculation module corrects the guiding coordinate position of the return side according to the relative correction parameter to obtain a corrected guiding coordinate position: then the calculation module calculates a deviation value between the corrected guiding coordinate position and the coordinate position of the unmanned vehicle, and transmits the deviation value to the vehicle side control module, and the vehicle side control module controls the unmanned vehicle to arrive at the return side according to the deviation value. The coordinate position of the unmanned vehicle is provided to the calculation module by the vehicle side navigation sensing module.

In an embodiment, the system for mobile landing of the unmanned vehicle further comprises a return side control module and a return side navigation sensing module. The return side control module is electrically connected to the vehicle side control module. The return side navigation sensing module is electrically connected to the return side control module.

In an embodiment, the system for mobile landing of the unmanned vehicle further comprises a vehicle side communication module and a return side communication module. The vehicle side communication module is provided in the vehicle body and is electrically connected to the vehicle side control module. The return side communication module is electrically connected to the return side communication module and the return side control module.

In an embodiment, the system for mobile landing of the unmanned vehicle further comprises a power source. The power source is provided in the vehicle body, and is electrically connected to the three-dimensional sensing module, the calculation module, the vehicle side control module, the vehicle side navigation sensing module, and the vehicle side communication module.

In an embodiment, the calculation module is a vehicle-mounted computer. The three-dimensional sensing module is an image capturing device.

The present invention further discloses a method for mobile landing of an unmanned vehicle, comprising the steps of:

determining whether a landing target pattern is detected: capturing, by a three-dimensional sensing module, an external image of the unmanned vehicle to detect whether there is a landing target pattern, the landing target being a moving object, and if so, proceeding to the next step:

calculating a coordinate position of the target pattern relative to the unmanned vehicle: transmitting, by the three-dimensional sensing module, the landing target pattern to a computing unit, and calculating, by the computing unit, a guiding coordinate position of the landing target pattern relative to a return side according to the landing target pattern, to calculate a relative correction parameter of the guiding coordinate position of the return side relative to a coordinate position of the unmanned vehicle:

correcting the coordinate position of the return side: correcting, by a filtering unit, the guiding coordinate position of the return side according to the relative coordinate position to obtain a corrected guiding coordinate position, and then calculating, by the filtering unit, a deviation value between the corrected guiding coordinate position and the coordinate position of the unmanned vehicle and transmitting the deviation value to a vehicle side control module; and controlling the unmanned vehicle to arrive at the return side: controlling, by the vehicle side control module, the unmanned vehicle to arrive at the return side according to the deviation value.

In an embodiment, in the step of determining whether a landing target pattern is detected, if not, the method further comprising:

correcting a deviation between the navigation sensing modules: transmitting, by the vehicle side navigation sensing module, the coordinate position of the unmanned vehicle to the computing unit, providing, by a return side navigation sensing module, a guiding coordinate position of a return side to the computing unit, and calculating, by the computing unit, a deviation value between the coordinate position of the unmanned vehicle and the guiding coordinate position of the return side and transmitting the deviation value to the vehicle side control module; and controlling the unmanned vehicle to arrive at the return side: controlling, by the vehicle side control module, the unmanned vehicle to arrive at the return side according to the deviation value.

According to the system and method for mobile landing of the unmanned vehicle of the present invention, the landing target pattern detected by the three-dimensional sensing module and the filtering unit are utilized to find the deviation between the return side navigation sensing module and the vehicle side navigation sensing module, thereby achieving more accurate navigational position prediction; and by reducing the error in coordinates of the landing target detected by the three-dimensional sensing module due to the attitude change of the unmanned vehicle, the success degree of the three-dimensional sensing module in recognizing the landing target is increased due to trajectory correction, and a precise and dynamic target landing is achieved.

BRIEF DESCRIPTION OF THE DRAWINGS

The techniques of present invention would be more understandable from the detailed description given herein below and the accompanying figures are provided for better illustration, and thus description and figures are not limitative for present invention, and wherein.

DETAILED DESCRIPTION OF THE INVENTION

Figure 1:
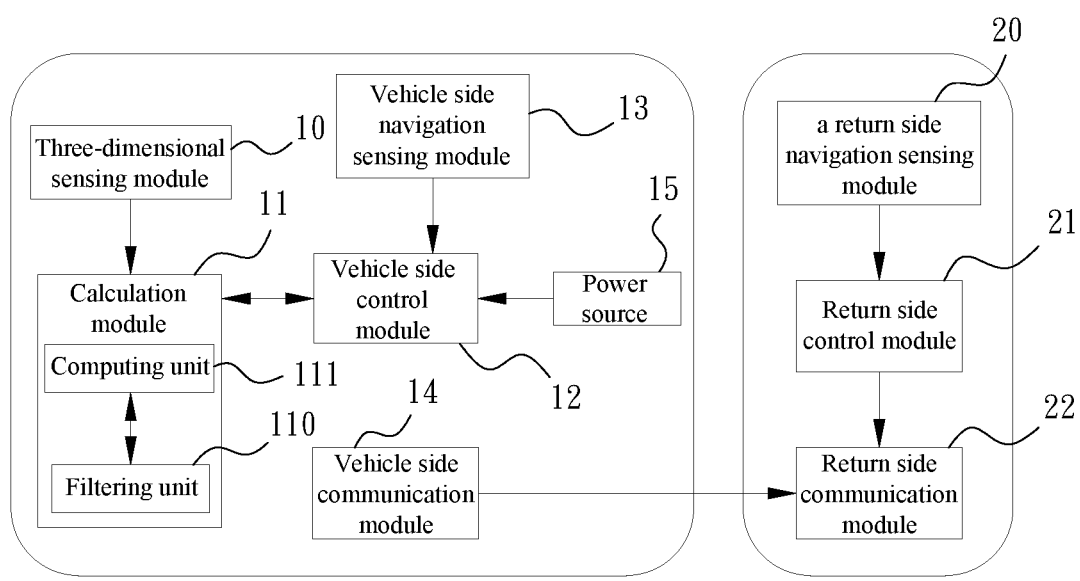
FIG. 1 shows a schematic diagram of a system for mobile landing of an unmanned vehicle of the present invention.

Referring to FIG. 1, it shows a schematic diagram of a system for mobile landing of an unmanned vehicle of the present invention. As shown, the system for mobile landing of the unmanned vehicle of the present invention comprises a three-dimensional sensing module 10, a calculation module 11, a vehicle side control module 12, a vehicle side navigation sensing module 13, a vehicle side communication module 14, a power source 15, a return side navigation sensing module 20, a return side control module 21 and a return side communication module 22.

The unmanned vehicle further comprises a vehicle body (not shown). The three-dimensional sensing module 10 is mounted in the vehicle body and is an image capturing device (e.g., a camera). The calculation module 11 is mounted in the vehicle body and electrically connected to the three-dimensional sensing module 10, and may be a vehicle-mounted computer, and the calculation module 11 comprises a filtering unit 110 and a computing unit 111.

The vehicle side control module 12 is mounted in the vehicle body and electrically connected to the calculation module 11. The vehicle side navigation sensing module 13 is mounted in the vehicle body and electrically connected to the vehicle side control module 12. The vehicle side sensing navigation module 13 may be a GNSS. The vehicle side communication module 14 is mounted in the vehicle body and electrically connected to the vehicle side control module 12. The power source 15 is mounted in the vehicle body and is a battery or a fuel cell, and is electrically connected to the three-dimensional sensing module 10, the calculation module 11, the vehicle side control module 12, the vehicle side navigation sensing module 13, and the vehicle side communication module 14. The power source 15 provides electrical energy to the three-dimensional sensing module 10, the calculation module 11, the vehicle side control module 12, the vehicle side navigation sensing module 13, and the vehicle side communication module 14.

The return side navigation sensing module 20 may be a GNSS. The return side control module 21 is electrically connected to the return side navigation sensing module 20. The return side communication module 22 is electrically connected to the return side control module 21 and the vehicle side communication module 14.

The return side control module 21 transmits a control signal to the vehicle side control module 12 through the return side communication module 22 and the vehicle side communication module 14. The vehicle side control module 12 controls the unmanned vehicle according to the control signal.

The three-dimensional sensing module 10 captures an external image of the unmanned vehicle to detect whether there is a landing target pattern, where the landing target is a moving object, such as a ship, a vehicle, etc. The return side navigation sensor module 20, the return side control module 21 and the return side communication module 22 mentioned above are provided at the landing target, which can also be referred to as a return side.

If the three-dimensional sensing module 10 does not detect a landing target pattern, the vehicle side navigation sensing module 13 transmits a coordinate position of the unmanned vehicle to the computing unit 111, and the return side navigation sensing module 20 transmits a guiding coordinate position of the return side to the computing unit 111 through the return side communication module 22. The computing unit 111 calculates a deviation value between the coordinate position of the unmanned vehicle and the guiding coordinate position of the return side, and transmits the deviation value to the vehicle side control module 12. The vehicle side control module 12 controls the unmanned vehicle to arrive at the return side according to the deviation value.

If the three-dimensional sensing module 10 detects a landing target pattern, the three-dimensional sensing module 10 transmits the landing target pattern to the computing unit 111, the computing unit 111 calculates a relative correction parameter of the guiding coordinate position of the return side relative to the coordinate position of the unmanned vehicle according to the landing target pattern and the guiding coordinate position of the return side and transmits the relative correction parameter to the filtering unit 110.

The filtering unit 110 corrects the guiding coordinate position of the return side according to the relative correction parameter to obtain a corrected guiding coordinate position, and the filtering unit 110 then calculates a deviation value between the corrected guiding coordinate position and the coordinate position of the unmanned vehicle and transmits the deviation value to the vehicle side control module 12. The vehicle side control module 12 controls the unmanned vehicle to arrive at the return side according to the deviation value.

Operation of the filtering unit 110 described above is as follows:

system vector X=[longitude_deviation, latitude_deviation, longitude, latitude], and output vector Y=[longitude, latitude].

$$A = \begin{bmatrix} 0010 \\ 0001 \end{bmatrix},$$

$$H = \begin{bmatrix} 1000 \\ 0100 \\ \Delta t 010 \\ 0 \Delta t 01 \end{bmatrix},$$

A is a state transition model, H is an observation model, Δt is sampling time, W is a mean-zero system noise, and V is mean-zero measurement noise. After the position of the landing target is corrected by the filtering unit 110 above, the unmanned vehicle is controlled to arrive at the landing target to achieve a precise landing.

Figure 2:
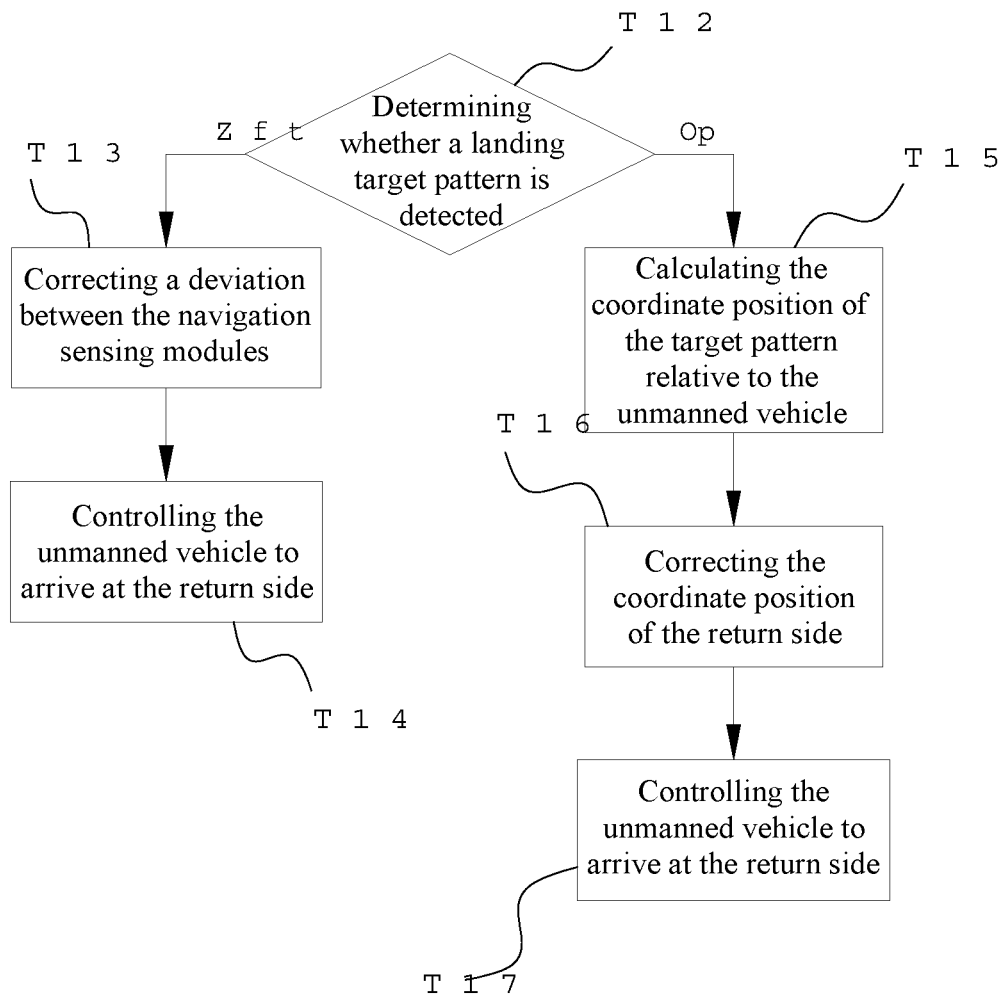
FIG. 2 shows a schematic flow chart of a method for mobile landing of the unmanned vehicle of the present invention.

Referring to FIG. 2, it shows a schematic flow chart of a method for mobile landing of an unmanned vehicle of the present invention. As shown, the method for mobile landing of the unmanned vehicle of the present invention comprises the following steps.

S01, determining whether a landing target pattern is detected: capturing, by a three-dimensional sensing module 10, an external image of the unmanned vehicle to detect whether there is a landing target pattern, the landing target being a moving object: if not, proceeding to S02: if so, proceeding to S04.

S02, correcting a deviation between the navigation sensing modules: transmitting, by the vehicle side navigation sensing module 13, the coordinate position of the unmanned vehicle to the computing unit 111, and transmitting, by the return side navigation sensing module 20, the guiding coordinate position of the return side to the computing unit 111 through the return side communication module 22. The computing unit 111 calculates a deviation value between the coordinate position of the unmanned vehicle and the guiding coordinate position of the return side, and transmits the deviation value to the vehicle side control module 12.

S03, controlling the unmanned vehicle to arrive at the return side: controlling, by the vehicle side control module 12, the unmanned vehicle to arrive at the return side according to the deviation value.

S04, calculating the coordinate position of the target pattern relative to the unmanned vehicle: detecting and transmitting, by the three-dimensional sensing module 10, a landing target pattern to the computing unit 111, and calculating, by the computing unit 111, a relative correction parameter of a guiding coordinate position of a return side relative to the coordinate position of the unmanned vehicle according to the landing target pattern and the guiding coordinate position of the return side, and transmitting, by the computing unit 111, the relative correction parameter to the filtering unit 110. The landing target pattern changes depending on an attitude change of the unmanned vehicle or a location of the landing target. The return side navigation sensing module 20 transmits the guiding coordinate position of the return side to the computing unit 111 through the return side communication module 22.

S05, correcting the coordinate position of the return side: correcting, by the filtering unit 110, the guiding coordinate position of the return side according to the relative correction parameter to obtain a corrected guiding coordinate position, and then calculating, by the filtering unit 110, a deviation value between the corrected guiding coordinate position and the coordinate position of the unmanned vehicle and transmitting the deviation value to the vehicle side control module 12. The coordinate position of the unmanned vehicle is provided by the vehicle side navigation sensing module 13 to the vehicle side control module 12, and the vehicle side control module 12 provides the coordinate position of the unmanned vehicle to the calculation module 11.

S06, controlling the unmanned vehicle to arrive at the return side: controlling, by the vehicle side control module 12, the unmanned vehicle to arrive at the return side according to the deviation value.

In summary, according to the system and method for mobile landing of the unmanned vehicle of the present invention, the landing target pattern detected by the three-dimensional sensing module 10 and the filtering unit are utilized to find an error (the deviation value above) between the landing target (the return side) and the vehicle side navigation sensing module 13, thereby achieving more accurate navigational position prediction; and by reducing the error in coordinates of the landing target detected by the three-dimensional sensing module 10 caused by the attitude change of the unmanned vehicle, the success degree of the three-dimensional sensing module 10 in recognizing the landing target is increased due to trajectory correction, and precise and dynamic target landing is achieved.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for mobile landing of an unmanned vehicle comprising a vehicle body, the system for mobile landing of the unmanned vehicle comprising:
    a three-dimensional sensing module provided in the vehicle body;
    a calculation module provided in the vehicle body and electrically connected to the three-dimensional sensing module, wherein the calculation module comprises a filtering unit and a computing unit;
    a vehicle side control module provided in the vehicle body and electrically connected to the calculation module; and
    a vehicle side navigation sensing module provided in the vehicle body and electrically connected to the vehicle side control module;
    wherein the three-dimensional sensing module captures an external image of the unmanned vehicle to detect whether there is a landing target pattern, the three-dimensional sensing module transmits the landing target pattern to the calculation module, the landing target being a moving object; the computing unit of the calculation module calculates a relative correction parameter of a guiding coordinate position of a return side relative to a coordinate position of the unmanned vehicle according to the landing target pattern and the guiding coordinate position of the return side; the filtering unit of the calculation module corrects the guiding coordinate position of the return side according to the relative correction parameter to obtain a corrected guiding coordinate position; then the filtering unit of the calculation module calculates a deviation value between the corrected guiding coordinate position and the coordinate position of the unmanned vehicle, and transmits the deviation value to the vehicle side control module, and the vehicle side control module controls the unmanned vehicle to arrive at the return side according to the deviation value; and the coordinate position of the unmanned vehicle is provided to the calculation module by the vehicle side navigation sensing module.

2. The system for mobile landing of the unmanned vehicle according to claim 1, further comprising:
    a return side control module electrically connected to the vehicle side control module; and
    a return side navigation sensing module electrically connected to the return side control module.

3. The system for mobile landing of the unmanned vehicle according to claim 2, wherein the return side navigation sensing module and the vehicle side sensing module form a satellite navigation system.

4. The system for mobile landing of the unmanned vehicle according to claim 3, further comprising a vehicle side communication module and a return side communication module; the vehicle side communication module is provided in the vehicle body and is electrically connected to the vehicle side control module; and the return side communication module is electrically connected to the return side communication module and the return side control module.

5. The system for mobile landing of the unmanned vehicle according to claim 3, further comprising a power source provided in the vehicle body and electrically connected to the three-dimensional sensing module, the calculation module, the vehicle side control module, the vehicle side navigation sensing module, and the vehicle side communication module.

6. The system for mobile landing of the unmanned vehicle according to claim 1, wherein the calculation module is a vehicle-mounted computer; and the three-dimensional sensing module is an image capturing device.

7. A method for mobile landing of an unmanned vehicle, comprising the steps of:
    determining whether a three-dimensional sensing module captures an external image of the unmanned vehicle to detect whether there is a landing target pattern, the three-dimensional sensing module transmits the landing target pattern to the calculation module, the landing target being a moving object, and if so, proceeding to the next step;
    calculating a coordinate position of the target pattern relative to the unmanned vehicle: transmitting, by the three-dimensional sensing module, the landing target pattern to a computing unit of a calculation module, and then calculating, by the computing unit of the calculation module, a relative correction parameter of the guiding coordinate position of a return side relative to the coordinate position of the unmanned vehicle according to the landing target pattern and the guiding coordinate position of the return side;
    correcting the coordinate position of the return side: correcting, by a filtering unit of the calculation module, the guiding coordinate position of the return side according to the relative correction parameter to obtain a corrected guiding coordinate position, and then calculating, by the filtering unit of the calculation module, a deviation value between the corrected guiding coordinate position and the coordinate position of the unmanned vehicle and transmitting the deviation value to a vehicle side control module; and
    controlling the unmanned vehicle to arrive at the return side: controlling, by the vehicle side control module, the unmanned vehicle to arrive at the return side according to the deviation value.

8. The method for mobile landing of the unmanned vehicle according to claim 7, wherein in the step of determining whether a landing target pattern is detected, if not, the method further comprises: correcting a deviation between the navigation sensing modules: transmitting, by the vehicle side navigation sensing module, the coordinate position of the unmanned vehicle to the computing unit, providing, by a return side navigation sensing module, a guiding coordinate position of the return side to the computing unit, and calculating, by the computing unit, a deviation value between the coordinate position of the unmanned vehicle and the guiding coordinate position of the return side and transmitting the deviation value to the vehicle side control module; and controlling the unmanned vehicle to arrive at the return side: controlling, by the vehicle side control module, the unmanned vehicle to arrive at the return side according to the deviation value.

* * * * *